United States Patent
Haimer

(10) Patent No.: US 11,267,054 B2
(45) Date of Patent: Mar. 8, 2022

(54) CHUCKING APPARATUS FOR CHUCKING AN OBJECT, IN PARTICULAR A TOOL, TOOL HOLDING FIXTURE AND MACHINE TOOL

(71) Applicant: FRANZ HAIMER MASCHINENBAU KG, Igenhausen (DE)

(72) Inventor: Franz Haimer, Igenhausen (DE)

(73) Assignee: Franz Haimer Maschinenbau KG, Igenhausen (DE)

( * ) Notice: Subject to any disclaimer, the term of this patent is extended or adjusted under 35 U.S.C. 154(b) by 0 days.

(21) Appl. No.: 16/895,086

(22) Filed: Jun. 8, 2020

(65) Prior Publication Data
US 2020/0384544 A1    Dec. 10, 2020

(30) Foreign Application Priority Data
Jun. 6, 2019    (DE) .............................. 102019115387

(51) Int. Cl.
*B23B 31/20*    (2006.01)

(52) U.S. Cl.
CPC ........ *B23B 31/201* (2013.01); *B23B 31/2012* (2021.01); *B23B 2260/008* (2013.01); *B23B 2260/116* (2013.01); *Y10T 279/17299* (2015.01); *Y10T 279/17504* (2015.01)

(58) Field of Classification Search
CPC .............. B23B 31/201; B23B 31/2012; B23B 2231/2083; Y10T 279/17299; Y10T 279/17504; Y10T 279/17538
See application file for complete search history.

(56) References Cited

U.S. PATENT DOCUMENTS

| 2,749,134 | A |   | 6/1956 | Penasack |
| 2,784,976 | A | * | 3/1957 | Ondeck ............... B23B 31/1253 279/48 |
| 3,523,693 | A |   | 8/1970 | Sykes |
| 3,894,743 | A | * | 7/1975 | Hiroumi ................. B23B 31/20 279/47 |
| 5,788,248 | A |   | 8/1998 | Gibson |
| 5,944,327 | A | * | 8/1999 | Kanaan ................ B23B 31/201 279/51 |

(Continued)

FOREIGN PATENT DOCUMENTS

| DE | 102015002943 A1 | 9/2016 |
| DE | 102015113099 A1 | 2/2017 |

(Continued)

*Primary Examiner* — Eric A. Gates
(74) *Attorney, Agent, or Firm* — Laurence A. Greenberg; Werner H. Stemer; Ralph E. Locher

(57) ABSTRACT

A chucking apparatus for chucking an object contains a basic body which has a receiving space in which the object can be disposed. A chucking device is provided with a chucking nut which is screwable onto the basic body and by the chucking nut being screwed onto the basic body the object disposed in the receiving space can be chucked non-rotatably. The chucking nut has a plurality of roller bodies having a defined roller engagement structure. The roller bodies are held in an axially rotatable manner on a chucking body of the chucking nut and are arranged distributed in the circumferential direction on the chucking nut. The rollers by their roller engagement structure are in engagement with the basic body engagement structure of the basic body.

21 Claims, 7 Drawing Sheets

(56) References Cited

U.S. PATENT DOCUMENTS

| | | | |
|---|---|---|---|
| 10,464,141 B2 | 11/2019 | Haimer et al. |
| 2017/0036275 A1 | 2/2017 | Haimer |
| 2018/0071833 A1 | 3/2018 | Haimer |

FOREIGN PATENT DOCUMENTS

| | | |
|---|---|---|
| DE | 102016110087 A1 | 12/2017 |
| JP | S5721206 A | 2/1982 |
| JP | S57184610 A | 11/1982 |
| WO | 9817430 A1 | 4/1998 |

* cited by examiner

CHUCKING APPARATUS FOR CHUCKING AN OBJECT, IN PARTICULAR A TOOL, TOOL HOLDING FIXTURE AND MACHINE TOOL

CROSS-REFERENCE TO RELATED APPLICATION

This application claims the priority, under 35 U.S.C. § 119, of German patent application DE 10 2019 115 387, filed Jun. 6, 2019; the prior application is herewith incorporated by reference in its entirety.

BACKGROUND OF THE INVENTION

Field of the Invention

The invention relates to a chucking apparatus for chucking an object, to a tool holding fixture for a machine tool having the chucking apparatus and to a machine tool having the tool holding fixture.

A multiplicity of mechanisms is known by means of which a tool, for example a milling tool, can be chucked non-rotatably on a tool holding fixture for a machine tool. A tool can be chucked here, for example, by means of a collet chuck provided on the tool holding fixture. A collet chuck of this type conventionally has a collet which is resilient in the radial direction and has an outer cone. The collet is arranged in a receiving space of a basic body of the tool holding fixture, which receiving space forms an inner cone. The collet arranged in the receiving space can be pressed into the receiving space by means of a chucking nut of the collet chuck, the chucking nut being screwable onto the basic body. The collet is compressed here in the radial direction under the action of the cone surfaces of the outer cone of the collet and the inner cone of the basic body and a tool disposed with its tool shank in a tool receiving space of the collet is chucked.

A tool holding fixture having a collet chuck is known, for example, from published, non-prosecuted German patent application DE 10 2015 002 943 A1, corresponding to U.S. patent publication No. 2018/0071833.

For the desired non-rotatable chucking of a tool by means of a collet chuck, it is conventionally required to form the chucking nut thread and the corresponding thread of the basic body with a small thread pitch. This enables the required relatively high axial force for pressing the collet into the receiving space of the basic body to also be achieved with little effort or also during a manual rotational actuation of the chucking nut.

However, because of the small thread pitch, the screwing distance for screwing the chucking nut onto the basic body is relatively long. In addition, when the chucking nut is screwed onto the basic body, high frictional forces have to be overcome over a long screwing distance because of the small thread pitch. Furthermore, a conventional collet chuck customarily achieves lower chucking forces for chucking a tool than in the case of other chucking systems, in particular in comparison to a shrink fit chuck.

For these reasons, the chucking region in customary collet systems is restricted to smaller tool diameters.

BRIEF SUMMARY OF THE INVENTION

It is the object of the invention to provide a chucking apparatus for chucking an object, in particular a tool, by means of which the object can be chucked with a high chucking force in a simple and effective manner.

This object is achieved by the features of the independent claims. Preferred developments are disclosed in the dependent claims.

Accordingly, a chucking apparatus for chucking an object, in particular a tool, is proposed, containing a basic body which has an, in particular cylindrical or conical, receiving space in which the object can be disposed. The chucking device is provided with a chucking nut which is screwable onto the basic body and by the chucking nut being screwed onto the basic body the object disposed in the receiving space can be chucked nonrotatably.

According to the invention, the chucking nut has a plurality of, in particular cylindrical, roller bodies having a defined roller engagement structure, wherein the roller bodies are held in an axially rotatable manner on an, in particular sleeve-shaped, chucking body of the chucking nut and are arranged distributed in the circumferential direction on the chucking nut.

Alternatively thereto according to the invention, a plurality of, in particular cylindrical, roller bodies having a defined roller engagement structure are also provided, which roller bodies are held and are arranged in an axially rotatable manner and distributed in the circumferential direction between the, in particular sleeve-shaped, chucking body of the chucking nut and the basic body.

In clear and simple terms, both alternatives according to the invention provide a plurality of, in particular cylindrical, roller bodies having a defined roller engagement structure, the roller bodies—to this extent in principle—being held and arranged in an axially rotatable manner and distributed in the circumferential direction between the chucking nut or the chucking body of the chucking nut and the basic body. While the first-mentioned alternative envisages or indicates that the roller bodies are part of the chucking nut, the alternative mentioned second views the roller bodies as separate components which are arranged between the chucking nut or the chucking body of the chucking nut and the basic body.

In addition, at least one basic body engagement structure is formed on the basic body of the tool holding fixture, wherein the roller bodies by means of their roller engagement structure are in engagement or can be brought into engagement with the at least one basic body engagement structure of the basic body. Furthermore, the chucking nut can be screwed onto the basic body and can be unscrewed from the basic body by means of the engagement structure(s) in engagement with one another, in particular by the roller bodies rolling on the basic body.

An object can thereby be chucked simply and effectively with a high chucking force since, in the construction according to the invention, the chucking nut is not in contact or in engagement along its entire circumference with the basic body, but rather merely with the roller bodies which are held in an axially rotatable manner. The frictional forces acting when the chucking nut is screwed onto the basic body are thus significantly reduced. Also only rolling friction and no sliding friction as in conventional threads has to be overcome. As a result, the screw thread can be configured in such a manner that the chucking force for chucking an object disposed in the receiving space is effectively increased while the effort for the rotational actuation of the chucking nut remains the same. It is therefore also possible to also reliably chuck objects having a large diameter.

In a preferred refinement of the chucking apparatus according to the invention, it is provided that the basic body engagement structure is formed by a thread having at least one encircling thread groove, wherein the thread groove forms at least one web running helically on the outer side around the basic body. The chucking nut can be functionally reliably screwed onto the basic body via such a screw thread, which is configured in particular as a conventional external thread. In addition, such an external thread can be manufactured particularly simply.

The thread here is preferably configured as a multi-lead thread, wherein in particular the number of thread leads corresponds to the number of roller bodies held on the chucking nut or between the chucking nut and the basic body. The chucking nut can thus be screwed onto the basic body or unscrewed from the basic body in a particularly simple and functionally reliable manner.

Alternatively, however, the thread can also be formed by a single-lead thread.

In an alternative preferred refinement, it can also be provided that a plurality of engagement regions which are distributed in particular in the circumferential direction and/or are spaced apart from one another and each have a basic body engagement structure are formed on the basic body, wherein the rollers by means of their roller engagement structure are in engagement or can be brought into engagement with the basic body engagement structures of the basic body. The chucking nut can then be screwed here onto the basic body and unscrewed from the basic body by means of the engagement structures, which are in engagement with one another, of the roller bodies and the basic body, in particular by the roller bodies rolling on the basic body. An object can thus be chucked particularly simply and effectively since the axially rotatably held roller bodies in conjunction with the engagement regions, distributed in the circumferential direction, of the basic body significantly increase the design freedom for the screw thread for screwing the chucking nut onto the basic body. The screw thread can thereby be effectively optimized in respect of the chucking of an object disposed in the receiving space of the basic body. In particular, it is possible here to screw the chucking nut onto the basic body with a significantly shortened screwing distance.

Expediently, the basic body engagement structure of each basic body engagement region is formed by a plurality of encircling grooves which are spaced apart from one another, in particular in the axial direction and by means of which webs running on the outer side around the basic body are formed. The chucking nut can be screwed onto the basic body or unscrewed from the basic body in a simple and functionally reliable manner by means of such basic body engagement structures. It is preferably provided here that the basic body webs of each engagement region run parallel to one another.

The grooves of each basic body engagement region preferably form a basic body thread. By means of the basic body threads, the chucking nut can be effectively screwed on and unscrewed via the roller bodies which are in engagement with the thread. Each basic body thread extends here, as seen in the circumferential direction, from a starting region as far as an end region. It is preferred here if the thread pitch of each basic body thread changes, in particular is reduced, from the initial region toward the end region. The changing thread pitch makes it possible to effectively optimize the chucking of an object disposed in the receiving space of the basic body. In particular, a reduction in the thread pitch is advantageous here. As a result, the chucking nut upon being screwed onto the basic body can be initially guided with the roller bodies over a region having a high thread pitch, and therefore the chucking nut covers a relatively large axial distance over a short screwing distance. In this thread region, only a relatively small chucking force for chucking an object disposed in the receiving space is exerted by means of the chucking nut, and therefore the effort for screwing on the chucking nut is low despite the high thread pitch. Subsequently, the chucking nut can then be guided by means of its roller bodies over a region having a significantly reduced thread pitch. In the thread region, the chucking nut can then exert the maximum chucking force for chucking an object disposed in the receiving space. The small thread pitch furthermore enables the chucking nut to be screwed onto the basic body with relatively little effort.

The basic body threads formed on the engagement regions can preferably be introduced here into the basic body by means of a thread miller or by means of a thread grinding disk.

In a preferred specific refinement, each basic body thread, as seen in a top view of the basic body, has a curved profile continuously or in section. As a result, a continuous change in the thread pitch of the basic body thread and therefore also particularly simple and functionally reliable screwing of the chucking nut onto the basic body can be achieved. Alternatively or additionally, each basic body thread can have a plurality of, in particular two, pitch portions having a different constant thread pitch. The changing thread pitch can thus be used in a particularly simple manner. It is preferred here if a transition region having a continuously changing thread pitch is provided between the regions of constant thread pitch.

The roller engagement structure of each roller body is preferably formed by a plurality of encircling grooves which are spaced apart from one another in the roller axial direction and by means of which annular webs extending in the circumferential direction about the respective roller body are formed. By means of such a configuration of the roller engagement structures, the chucking nut can be screwed onto the basic body or unscrewed from the basic body in a simple and functionally reliable manner.

Furthermore, it may also be expedient if the flanks of the webs are spherical. A large supporting surface in terms of forces can thereby be achieved.

Alternatively, the roller engagement structure can also be configured itself as a continuous (external) thread, the pitch direction of which corresponds to the pitch direction of the basic body thread. By means of this configuration, a larger axial chucking distance is brought about during tightening of the chucking nut. Thread flanks may in turn also be spherical.

In a preferred specific refinement, each roller body has, in particular cylindrical, bearing journals which protrude on the end sides or from the end walls of the roller body and by means of which the respective roller body is held in an axially rotatable manner on the chucking body of the chucking nut. The roller bodies can thus be held reliably and effectively rotatable axially, i.e. rotatable about their longitudinal axis, on the chucking nut. The roller bodies can be held here on the chucking body directly or indirectly or via at least one connecting element.

Furthermore preferably, each roller body is mounted in an axially rotatable manner, in particular by means of the bearing journals, in an annular, in particular circular, bearing cage of the chucking nut. Via such a bearing cage, the roller bodies can simply be fastened in an axially rotatable manner and at a defined distance from one another in the circumferential direction to the chucking nut or to the sleeve-shaped chucking body of the chucking nut. It is preferably provided here that the annular bearing cage is formed in multiple parts with a plurality of, in particular cross-sectionally rectangular, ring segment elements and at least one roller body is assigned to at least one portion of the ring segment elements. This significantly simplifies the mounting of the bearing cage onto the chucking nut. It is particularly preferred here if a single roller body is assigned to each ring segment element.

The roller bodies are preferably also accommodated in a bearing cage, in particular a window-type cage having pockets for the roller bodies.

The bearing cage, in particular the window-type cage, can thus hold the roller bodies separately from one another in order to avoid mutual contact. It can also hold the roller bodies at the same distance, thus resulting in a more uniform distribution of load.

The roller bodies can be accommodated here with a large axial play in the pockets of the window-type cage in order thereby optionally to facilitate the screwing on of the bearing cage equipped with the roller bodies, or alternatively, the axial length of the pockets of the window-type cage can substantially correspond to the axial length of the roller bodies, as a result of which, in turn, more precise guidance is optionally possible.

Furthermore, it may be expedient if selected pockets of the window-type cage have an axial offset in relation to other pockets of the window-type cage, in particular if each pocket has an axial offset with respect to its respective neighbor.

The offset of the pockets can be adapted here to a thread pitch of the basic body engagement structure and/or of a chucking body engagement structure of the sleeve-shaped chucking body, by means of which chucking body engagement structure the chucking body is in engagement with the roller engagement structure of the roller bodies, and/or can be adapted to a number of roller bodies.

It is particularly preferably provided that in each case adjacent pockets—encircling in the circumferential direction—have an axial offset which is adapted to the thread pitch of the basic body engagement structure and/or the chucking body engagement structure and also to the number of roller bodies.

The adaption can preferably take place in such a manner that—if all of the pockets are distributed uniformly in the circumferential direction in the bearing cage and if the roller engagement structure of the roller bodies themselves is not a thread—the axial offset between in each case two adjacent pockets is identical in size and/or the overall offset of all of the pockets over the circumference of the bearing cage corresponds to a thread pitch in the basic body engagement structure and/or the chucking body engagement structure. The effect which can be achieved with such configurations is that the bearing cage—with the roller bodies arranged therein—can be screwed simply and securely onto the engagement structures (of chucking body and basic body).

The sleeve-shaped chucking body preferably has a chucking body engagement structure by means of which the chucking body is in engagement with the roller engagement structure of the roller bodies. Effective transmission of the axial chucking force from the roller bodies to the chucking nut and effective guidance of the roller bodies in the circumferential direction are thereby realized.

The chucking body engagement structure is preferably formed here by a plurality of encircling grooves which are spaced apart from one another, in particular in the axial direction, and by means of which annular webs extending on the inner side in the circumferential direction about the chucking body are formed.

However, it can also be provided that the chucking body engagement structure is formed by a thread having at least one encircling thread groove. The thread groove can be formed here by at least one web running helically on the inner side in the circumferential direction (U) about the chucking body.

It can also be provided here that the thread has a plurality of leads and in particular the number of thread leads corresponds to the number of roller bodies.

By means of such chucking body engagement structures, the chucking nut can be screwed onto the basic body and unscrewed from the basic body in a simple and functionally reliable manner.

In particular if the roller bodies have an (external) thread, it is, however, preferred that the chucking body engagement structure has an internal thread corresponding to the roller body external thread (or (and/or) the basic body engagement structure has an external thread corresponding to the roller body external thread). The components mentioned can be screwed/unscrewed in relation to one another in a simple and functionally reliable manner by means of such configurations.

It can also be provided that the chucking body engagement structure is arranged on an inside wall region, encircling in the circumferential direction (U), of the sleeve-shaped chucking body (21).

In a specific refinement, the sleeve-shaped chucking body here can have in particular a recess or depression which runs on the inside in the circumferential direction and in which the annular bearing cage is arranged in a manner matching the contours thereof. The bearing cage can thus be connected to the chucking body in a simple and effective manner. The bearing cage arranged in the recess is preferably held here on the sleeve-shaped chucking body so as to be rotatable relative to the chucking body in the circumferential direction. Expediently, a wall region of the sleeve-shaped chucking body, said wall region bounding the recess on the base side, can form the chucking body engagement structure.

In a further embodiment, the distances between the grooves of the chucking body engagement structure and/or of the roller engagement structure and/or of the basic body engagement structure can be adapted in such a manner that, under the application of high axial forces and the resulting deformations of the components, uniform wear patterns arise between mutually assigned engagement structures. In particular, the distance between the grooves in the chucking body engagement structure and/or the distance between the grooves in the basic body engagement structure can be selected to be smaller than the distance between the grooves of the roller engagement structures.

In a preferred specific refinement, the chucking device has a collet which is arranged in the receiving space, is resilient in the radial direction and has an outer cone. The collet can be pressed by means of the chucking nut into the receiving space of the basic body, the receiving space forming an inner cone, and therefore an object disposed in an, in particular cylindrical, object receiving space of the collet is chucked nonrotatably.

In particular, an annular connecting element can furthermore also be provided here via which the chucking nut is connected releasably to the collet, wherein in particular the annular connecting element is connected in an axially rotatable manner to the sleeve-shaped chucking body of the chucking nut by means of rolling bearings. Such a configuration permits in particular secure chucking and release of an object, such as a tool shank, in the collet even in the case of very high chucking forces.

Furthermore, it can also be provided here that the annular connecting element is connected or lockable to the collet by means of a locking apparatus, in particular a bayonet lock. The effect which can be achieved by this is that the collet upon being released can be changed without the chucking nut having to be released from the basic body.

Furthermore, an anti-twist means can also be provided between the collet and the basic body, wherein said anti-twist means can be formed in particular by axial extensions on the collet and complementary engagement points on the basic body.

Such a collet chuck can be used to chuck an object, such as a tool shank, particularly simply and with little expenditure of time. The collet here can be changed particularly simply and rapidly because of the particularly short screwing path of the chucking nut that is achievable by means of the construction according to the invention.

In an alternative refinement of the chucking device, it can also be provided that the chucking nut has an in particular sleeve-shaped cone body which is connected to the chucking body and has an inner cone wall region forming an inner cone. When the chucking nut is screwed onto the basic body the cone body by means of the inner cone wall region comes into, in particular flat, contact with a receiving portion of the basic body, the receiving portion forming the receiving space, and presses the receiving portion, in particular in the radial direction, inward against an object disposed in the receiving space and therefore chucks the object nonrotatably.

Particularly when such a cone body is used, the basic body here can preferably also have slots. The slots can be formed in a manner penetrating the cone body or as notches therein.

An object can thus be simply and effectively chucked without the use of a collet. In this embodiment, it is also possible to adapt the receiving portion to different object diameters, in particular tool shank diameters, by using cylindrical intermediate sleeves.

The basic body preferably has an end stop with which the chucking nut comes into contact upon being screwed onto the basic body. An undesirable over-rotation of the chucking nut can thus be effectively counteracted and a functionally reliable construction realized. It is preferably provided here that the end stop is formed by at least one wall region on the end side or oriented on the end side of the basic body. Alternatively, the end stop can also be formed by at least one wall region of the basic body, the wall region bounding a basic body engagement region in the circumferential direction.

The chucking apparatus preferably has a clamping device for clamping the chucking nut when the latter is screwed onto the basic body. The sleeve-shaped chucking body has an annular, in particular thin-walled, clamping web of the clamping device, the clamping web protruding from an end wall of the chucking body, in particular in the axial direction of the tool holding fixture, and by means of which the chucking nut when the latter is being screwed onto the basic body comes into, in particular flat, contact with a corresponding clamping wall region. An undesirable rotation of the chucking nut with respect to the basic body is thus effectively counteracted. The clamping wall region can be formed here, for example, by an annular shoulder, which protrudes, in particular radially, outward, of the basic body. Alternatively, the clamping wall region can also be formed by at least one, in particular annular, clamping element which is fixed to the basic body, is resilient in the axial direction of the tool holding fixture and can be tensioned by means of the chucking nut by the chucking nut being screwed on and can be untensioned by unscrewing of the chucking nut. A clamping element of this type can be formed, for example, by a disk spring or by an O ring.

Furthermore preferably, the chucking nut can be removed from the basic body and attached to the basic body. Each basic body engagement region here can be assigned a receiving groove of the basic body, the receiving groove running in particular in the axial direction and/or matching the contours of the roller bodies and into which the roller bodies are introduced by a circumferential portion when the chucking nut is attached to the basic body. Each basic body engagement region is adjacent here in the circumferential direction to the associated receiving groove. By means of such receiving grooves, the chucking nut can be screwed on or unscrewed particularly simply and rapidly.

Expediently, a receiving portion of the basic body, the receiving portion forming the receiving space, can have a substantially rotationally symmetrical shape.

Furthermore, a tool holding fixture having the chucking apparatus according to the invention is also claimed. The advantages resulting therefrom are identical to the advantages already acknowledged of the chucking apparatus according to the invention, and therefore the advantages are not repeated at this juncture.

Expediently, the tool holding fixture can have a coupling device by means of which the tool holding fixture can be coupled releasably to a drive device for rotationally driving the tool holding fixture, in particular to a machine tool drive spindle. The coupling device can be formed here by a conventional interface for coupling a tool holding fixture to a machine tool, for example by a steep taper interface (ST interface) or by a hollow shank taper interface (HST interface).

Furthermore, a machine tool, in particular a milling machine, having the tool holding fixture according to the invention is also claimed. The advantages resulting therefrom are identical to the advantages already acknowledged of the chucking apparatus according to the invention, and therefore the advantages are likewise not repeated here.

The description provided above of advantageous refinements of the invention contains numerous features which are reproduced in a manner combined as a plurality in part in the individual dependent claims. However, these features can expediently also be considered individually and combined to form expedient further combinations. In particular, these features can be combined in each case individually and in any suitable combination with the method according to the invention.

Even where certain expressions are used in each case in the singular or in conjunction with a numeral in the description and/or in the patent claims, it is not the intention for the scope of the invention to be restricted, for said expressions, to the singular or to the respective numeral. Furthermore, the words "a" or "an" are to be understood not as numerals but as indefinite articles.

The characteristics, features and advantages of the invention described above, and the manner in which these are achieved, will become clearer and more comprehensible in conjunction with the following description of the exemplary embodiments of the invention that will be explained in more detail in conjunction with the drawing(s)/figure(s) (identical components and functions have the same reference signs in the drawings/figures).

The exemplary embodiments serve to explain the invention and do not restrict the invention to the combinations of features indicated therein, not even with respect to the functional features. In addition, features suitable for this purpose of any exemplary embodiment can also be considered explicitly in isolated form, can be removed from one exemplary embodiment, introduced into another exemplary embodiment to supplement the latter and can be combined with any of the claims.

Other features which are considered as characteristic for the invention are set forth in the appended claims.

Although the invention is illustrated and described herein as embodied in a chucking apparatus for chucking an object, in particular a tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

DETAILED DESCRIPTION OF THE
INVENTION

Figure 1:
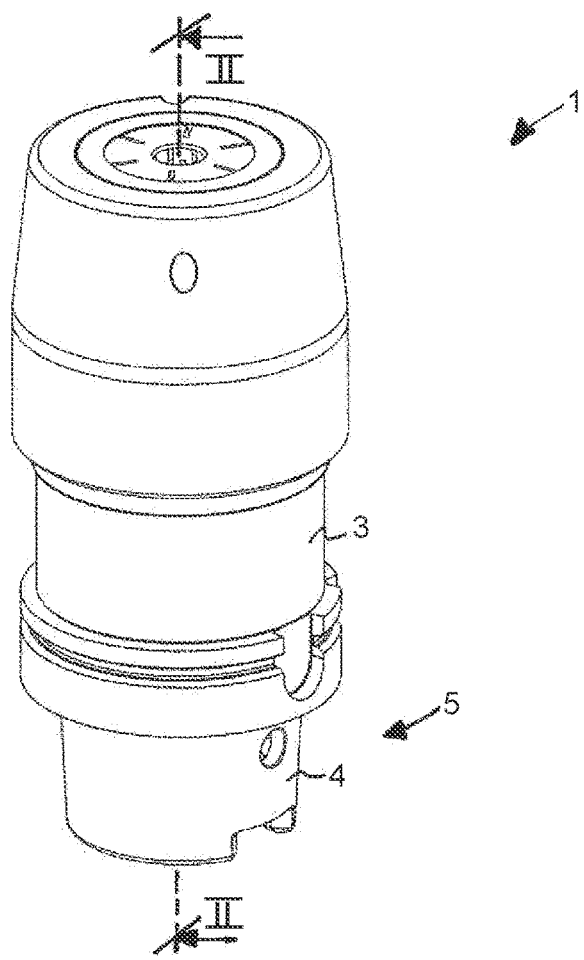
FIG. 1 is a diagrammatic, perspective view of a tool holding fixture having a chucking apparatus according to the invention.

Referring now to the figures of the drawings in detail and first, particularly to FIG. 1 thereof, there is shown a first exemplary embodiment of a tool holding fixture 1 with a chucking apparatus according to the invention. The tool holding fixture 1 has a basic body 3 with a coupling portion 5 having a coupling device 4. The tool holding fixture 1 can be coupled releasably to a drive spindle of a machine tool, not shown here, by means of the coupling device 4. The coupling device 4 is formed here by way of example by a conventional HST interface.

Figure 2:
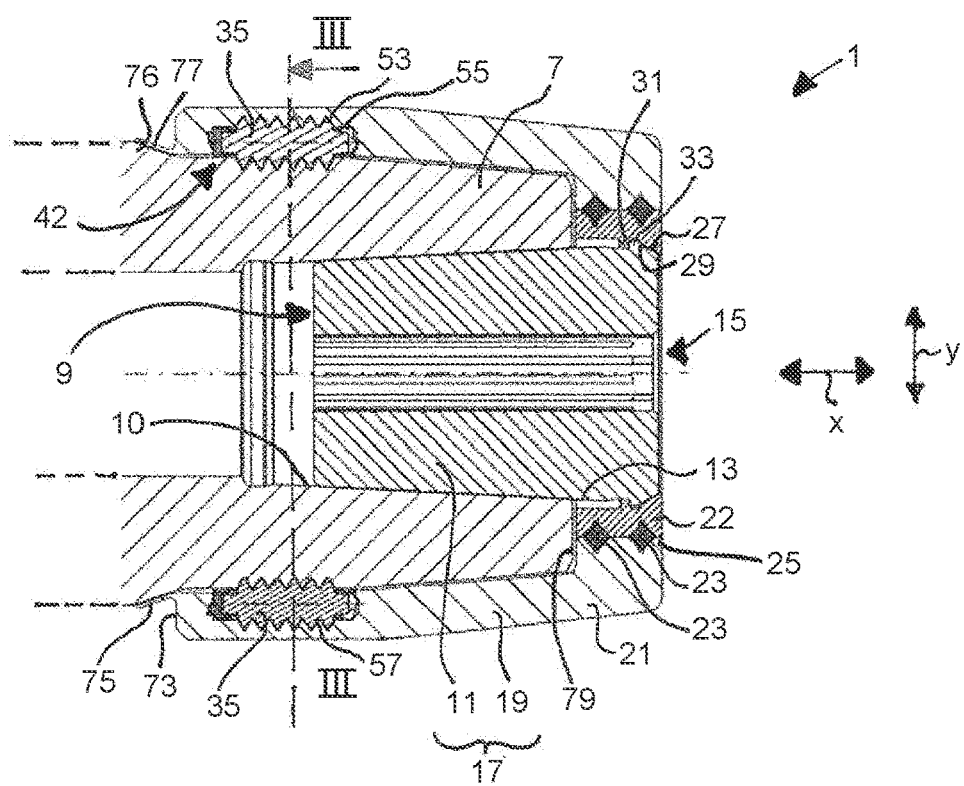
FIG. 2 is a sectional view taken along the sectional plane II-II from FIG. 1.

As is furthermore shown in FIG. 2, the basic body 3 also has a receiving portion 7, which here is rotationally symmetrical by way of example, with a centrally arranged receiving space 9. The receiving space 9 forms an inner cone 10 here. A collet 11 which is resilient in the radial direction r and has an outer cone 13 is arranged in the receiving space 9. The collet 11 is part of a chucking device 17 of the tool holding fixture 1, by means of which a tool, for example a milling tool, can be chucked nonrotatably on the tool holding fixture 1. The collet 11 here has a cylindrical tool receiving space 15 in which a tool which is to be chucked can be disposed with its tool shank.

As FIG. 2 furthermore reveals, the chucking device 17 also has a chucking nut 19 which is screwable onto the basic body 3 and by means of which the collet 11 can be pressed in the axial direction or longitudinal direction x into the receiving space 9. During such pressing in of the collet 11, the collet 11 is compressed in the radial direction r under the action of the cone surfaces of the inner cone 10 of the basic body 3 and the corresponding outer cone 13 of the collet 11. As a result, a tool which is arranged in the tool receiving space 15 can be chucked nonrotatably.

The chucking nut 19 has a sleeve-shaped chucking body 21, here likewise rotationally symmetrical by way of example, with which the chucking nut 19 can be pushed or screwed onto the receiving portion 7 of the basic body 3. In the pushed-on state of the chucking nut 19, the sleeve-shaped chucking body 21 engages annularly around the receiving portion 7 with a defined gap distance.

In addition, the chucking nut 19 also has an annular connecting element 22 via which the chucking nut 19 is connected releasably to the collet 11. The annular connecting element 22 is connected here in an axially rotatable manner to the sleeve-shaped chucking body 21 of the chucking nut 19 by means of rolling bearings 23. The rolling bearings 23 are in contact here, as seen in the radial direction r, on the outer side with an inwardly protruding annular web 25 of the sleeve-shaped chucking body 21 and on the inner side with the annular connecting element 22. The rolling bodies 23 are formed here by cylindrical roller bearings.

Furthermore, the annular connecting element 22 also has an inwardly protruding annular shoulder 27 with an inner cone, by means of which, when the chucking nut 19 is screwed on, the connecting element 22 can be brought into flat contact with an end-side wall region 29 of the collet 11, the wall region forming an outer cone. As the chucking nut 19 is screwed on further, the collet 11 can then be pressed into the receiving space 9 of the basic body 3 by means of the annular shoulder 27 of the chucking nut 19.

In addition, the connecting element 22 also has an inwardly protruding web 31 which is spaced apart in the axial direction x from the annular shoulder 27. In addition, an outwardly protruding web 33 of the collet 11 is arranged between the annular shoulder 27 and the annular web 31, as seen in the axial direction x. When the chucking nut 19 is unscrewed from the basic body 3, the collet 11 is pulled out of the receiving space 9 of the basic body 3 by means of the webs 31, 33.

In an alternative refinement, the connecting element of the chucking nut and the collet can also be coupled releasably to each other in such a manner that, even in the screwed-on state of the chucking nut, the collet can be released from the chucking nut and pulled out of the receiving space in order to change the collet. Such a coupling of chucking nut and collet is known, for example, from published non-prosecuted German patent application DE 10 2016 110 087 A1, the entire contents of which are incorporated into the subject matter of this application by reference.

Figure 3:
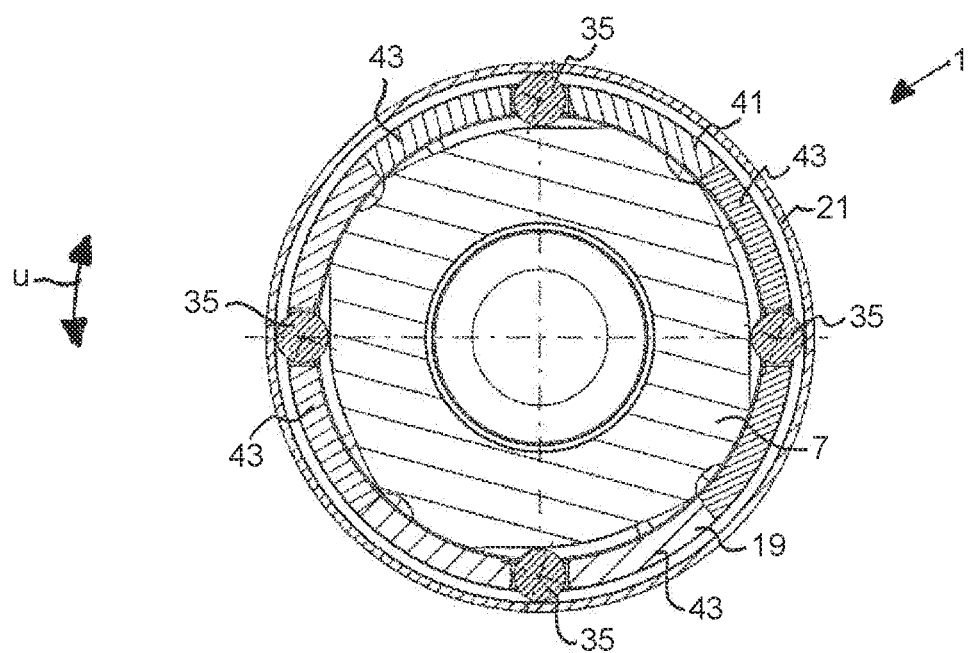
FIG. 3 shows a sectional illustration along the sectional plane III-Ill from FIG. 2.

According to FIGS. 2 and 3, the chucking nut 19 also has a plurality of, here by way of example four, cylindrical roller bodies 35 which are arranged distributed uniformly in the circumferential direction U on the chucking nut 19. According to FIG. 7, each roller body 35 here has cylindrical bearing journals 39 which protrude on the end sides or from the end walls 37 and by means of which the roller bodies 35 are mounted in an axially rotatable manner on an annular bearing cage 41 (FIG. 3) of the chucking nut 19. The annular bearing cage 41 is arranged together with the roller bodies 32 in a contour-matching manner in a recess 42, running on the inside in the circumferential direction U (FIG. 2), of the sleeve-shaped chucking body 21. The bearing cage 41 is held here by laterally outwardly protruding, elongate rear engagement webs 117 in the recess 42 in such a manner that the bearing cage 41 can be rotated relative to the sleeve-shaped chucking body 21 in the circumferential direction U.

Figure 6:
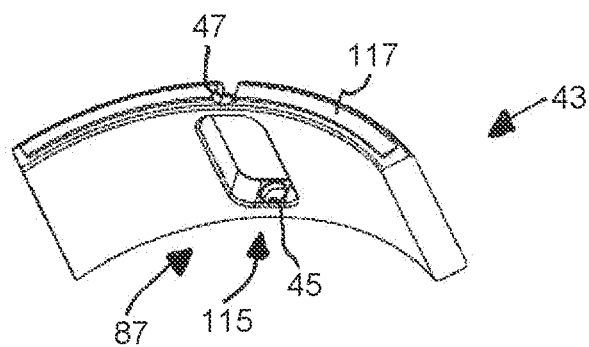
FIG. 6 is a perspective view of a ring segment element of the tool holding fixture.

Furthermore, the annular bearing cage 41 is formed here in multiple parts with a plurality of, here by way of example four, cross-sectionally rectangular ring segment elements 43 (FIG. 6). By way of example, a single roller body 35 is assigned here to each ring segment element 43. Each roller body 35 is arranged here in a continuous recess 115 in a manner matching the contours thereof on a central region 87, as seen in the circumferential direction U, of the respective ring segment element 43. In addition, each ring segment element 43 at the central region 87 has journal receptacles 45, 47 in which the bearing journals 39 of the roller bodies 35 are accommodated in a manner matching the contours thereof. The journal receptacle 45 of the respective ring segment element 43 is formed here by a bore while the journal receptacle 47 of the respective ring segment element 43 is formed by an outwardly opened slot. When the chucking nut 19 is installed, the roller bodies 35 are first of all guided here by one of the bearing journals 39 into the bore 45 and subsequently with the other of the bearing journals 41 into the slot 47. Furthermore, laterally outwardly protruding rear engagement webs 117 are also formed here on each ring segment element 43.

Figure 7:
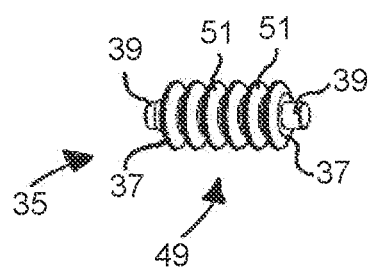
FIG. 7 is a perspective view of a roller body of the tool holding fixture.

According to FIG. 7, each roller body 35 also has a defined roller engagement structure 49. The roller engagement structure 49 of each roller body 35 is formed here by a plurality of grooves which are spaced apart from one another in the roller axial direction and by means of which annular webs 51 extending in the circumferential direction about the respective roller body 35 are formed. In addition, the longitudinal axis of the roller bodies 35 is arranged here parallel to the longitudinal axis of the chucking nut 19. Alternatively, the longitudinal axis of the roller bodies 35 could also be oriented, however, at a defined angle of incidence with respect to the longitudinal axis of the chucking nut 19.

The roller bodies 35 are in engagement by means of their roller engagement structure 49 with a chucking body engagement structure 53 (FIG. 2) of the chucking body 21, which chucking body engagement structure is formed on a wall region 55 of the chucking body 21, the wall region bounding the encircling recess 42 on the base side. The chucking body engagement structure 53 of the chucking body 21 is formed by a plurality of grooves which are spaced apart from one another in the axial direction x and by means of which annular webs 57 extending in the circumferential direction U about the chucking body 21 are formed. The chucking body engagement structure 53 here forms a guide for the roller bodies 35 in the circumferential direction U.

Figure 4:
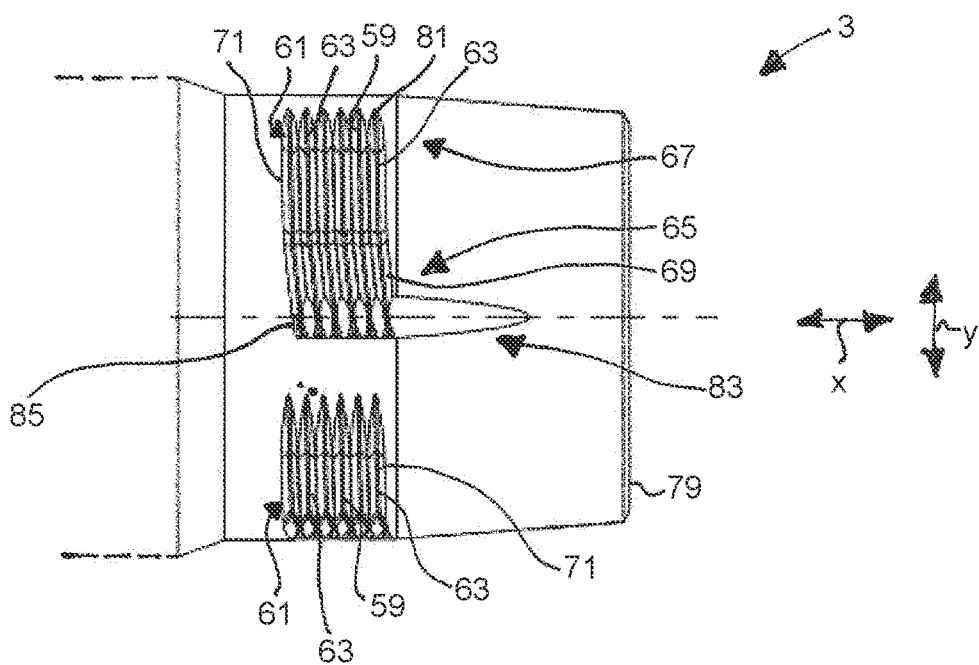
FIG. 4 is a top plan view of a basic body of the tool holding fixture.
Figure 5:
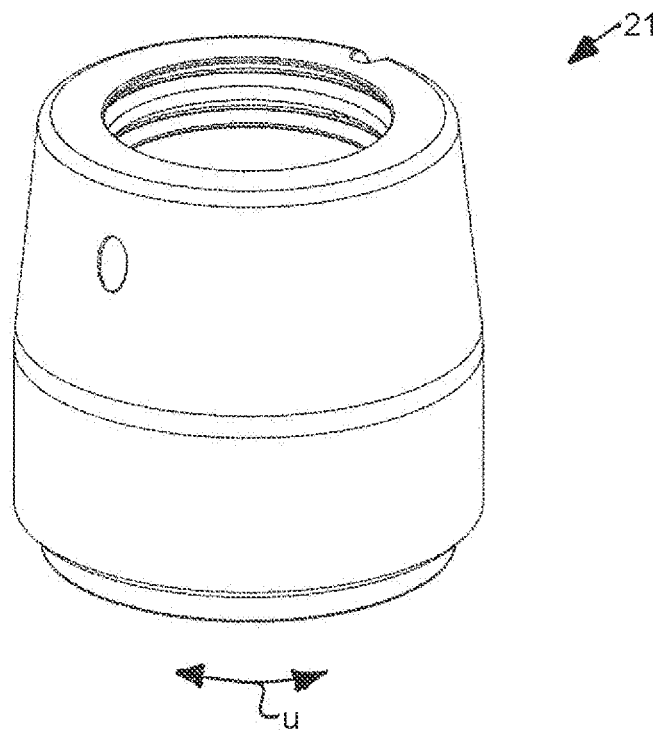
FIG. 5 is a perspective view of a chucking body of the tool holding fixture.

Furthermore, the basic body 3 of the tool holding fixture 1 also has a plurality of, here by way of example four, spaced-apart engagement regions 61 which are distributed uniformly in the circumferential direction U (FIG. 4) and have a basic body engagement structure 59 corresponding to the roller engagement structure 49. In the screwed-on state of the chucking nut 19, each roller body 35 by means of its roller engagement structure 49 is in engagement with the basic body engagement structure 59 of an engagement region 61. The basic body engagement structure 59 of each engagement region 61 is formed here by a plurality of spaced-apart, encircling grooves by means of which webs 63 running on the outer side around the basic body 3 are formed. The basic body webs 63 of each engagement region 61 run parallel to one another here.

In addition, the grooves of each basic body engagement region 61 here form a basic body thread. Each basic body thread extends 61 here, as seen in the circumferential direction U, from a starting region 65 as far as an end region 67, wherein the thread pitch of each basic body thread 61 is reduced from the initial region 65 toward the end region 67. Each basic body thread 61 here has a first pitch portion 69 with a first constant thread pitch and a second pitch portion 71 with a second constant thread pitch which is smaller than the first thread pitch. A transition region with a continuously or constantly changing thread pitch is provided between the portions with the constant thread pitch 69, 71.

The chucking nut 19 can be screwed onto the basic body 3 and unscrewed from the basic body 3 by means of the roller engagement structures 49 of the roller bodies 35 and the basic body engagement structures 59 of the basic body 3. The chucking nut 19 upon being screwed onto the basic body 3 is initially guided by means of the roller bodies 35 over the first pitch portion 69 with the higher thread pitch. A relatively large axial distance is covered here by means of the chucking nut 19 over a short screwing distance. In the thread region, only a small pressure is exerted in the axial direction x on the collet 11 by means of the chucking nut 19. Subsequently, the chucking nut 19 is guided by means of its chucking rollers 35 over the second pitch portion 71 with the smaller thread pitch. In this thread region, a higher or the maximum pressure is exerted in the axial direction x on the collet 11 by means of the chucking nut 19.

In addition, the chucking nut 19 can also be completely removed from the basic body 3. As a result, for example, the collet 11 can be released from the chucking nut 19 and replaced by another collet. In order to remove and attach the chucking nut 19, each basic body engagement region 61 here is assigned a receiving notch 83 of the basic body 3, the receiving notch running in the axial direction x and being matched to the contours of the roller bodies 35. During attaching of the chucking nut 19 to the basic body 3, a roller body 35 can be introduced by a circumferential portion into each receiving notch 83 until the collet 11 comes into contact with the basic body 3. Starting from the respective receiving notch 83, the roller bodies 35 can then be guided in the basic body engagement region 61 which is adjacent to the respective receiving notch 83 in the circumferential direction. In order to remove the chucking nut 19, the chucking nut 19 is arranged in a defined rotational position with respect to the basic body 3, in which rotational position the roller bodies 35 are arranged in the receiving notches 83. In this rotational position, the engagement structures of the roller bodies 35 and of the basic body 3 are disengaged, and therefore the chucking nut 19 can be displaced relative to the basic body 3 and removed from the basic body 3.

Furthermore, the tool holding fixture 1 here also has a clamping device for clamping the chucking nut 19 when the latter is screwed onto the basic body 3. The clamping device contains a thin-walled clamping web 75 (FIG. 2) which is formed on the chucking body 21, protrudes from a rear end wall 73 of the chucking body 21 and extends annularly in the circumferential direction U. By means of the clamping web 75, the chucking nut 19 upon being screwed onto the basic body 3 comes into flat contact with an outwardly protruding annular shoulder 76 of the basic body 3. Specifically, the chucking nut 19 here comes by means of the clamping web 75 into contact with an outer cone wall region 77, which forms an outer cone, of the annular shoulder 76. This takes place here only when the roller bodies 35 of the chucking nut 19 are located in the second pitch portion 71 of the basic body thread 61. Upon further screwing on of the chucking nut 19, the clamping web 75 is pressed against the outer cone wall region 77. Frictionally locking securing of the chucking nut 19 is thereby realized.

Furthermore, the basic body 3 can also have an end stop with which the chucking nut 19 comes into contact upon being screwed onto the basic body 3. The end stop can be formed, for example, by an end wall 79 of the basic body 3 or by a wall region 81 of the basic body 3, the wall region bounding a basic body engagement region 61 in the circumferential direction.

Figure 8:
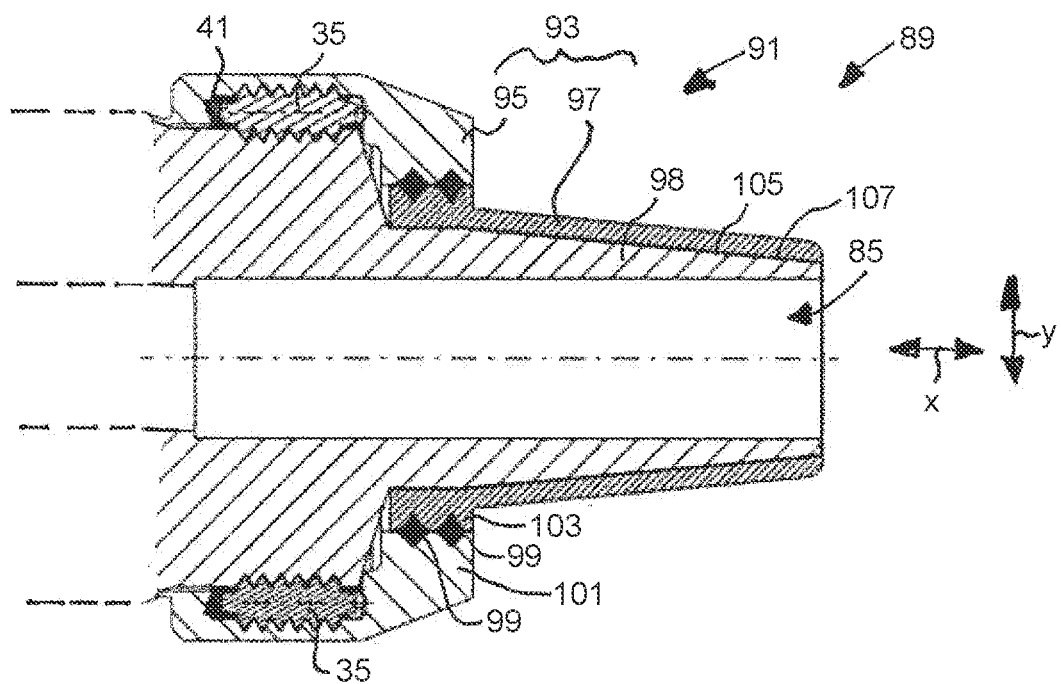
FIG. 8 is a sectional view according to FIG. 2, a second exemplary embodiment of a tool holding fixture with a chucking apparatus according to the invention.

FIG. 8 shows a second exemplary embodiment of a tool holding fixture 89 having a chucking device according to the invention. In comparison to the first exemplary embodiment shown in FIGS. 1 to 7, the tool holding fixture 89 here does not have the chucking device 17, but rather a chucking device 91 for chucking a tool. A tool is chucked in the chucking device 91 without a collet. Instead of the latter, the chucking device 91 here has a chucking nut 93 having a sleeve-shaped chucking body 95 and a likewise sleeve-shaped cone body 97 connected to the chucking body 95. The bearing cage 41 and the roller bodies 35 held thereon are assigned here to the chucking body 95. The chucking nut 93 can be pushed or screwed with the sleeve-shaped chucking body 95 and the sleeve-shaped cone body 97 onto a receiving portion 98 of the basic body 3.

A tool can be disposed by means of its tool shank in a cylindrical, centrally arranged receiving space 85 of the receiving portion 98. It goes without saying that the inside diameter of the receiving portion 98 can be adapted using a cylindrical reducing bushing to a tool shank, the outside diameter of which is smaller than the inside diameter of the receiving portion 98.

The cone body 97 is connected to the chucking body 95 in an axially rotatable manner by means of rolling bearings 99. The rolling bearings 99, as seen in the radial direction r, are in contact on the outer side with an inwardly protruding annular web 101 of the sleeve-shaped chucking body 95 and on the inner side with an outwardly protruding annular web 103 of the cone body 97. The rolling bearings 99 are formed here by cylindrical roller bearings.

Furthermore, the cone body 97 which is connected to the chucking body 95 has an inner cone wall region 105 which forms an inner cone and by means of which the cone body 97, as the chucking nut 93 is being screwed onto the basic body 3, comes into flat contact with a corresponding outer cone wall region 107, forming an outer cone, of the receiving portion 98. Under the action of the cone surfaces, the receiving portion 98, upon further screwing on of the chucking nut 93, is pressed inward in the radial direction r against a tool disposed in the receiving space 85 and thereby chucks the tool nonrotatably.

Figure 9:
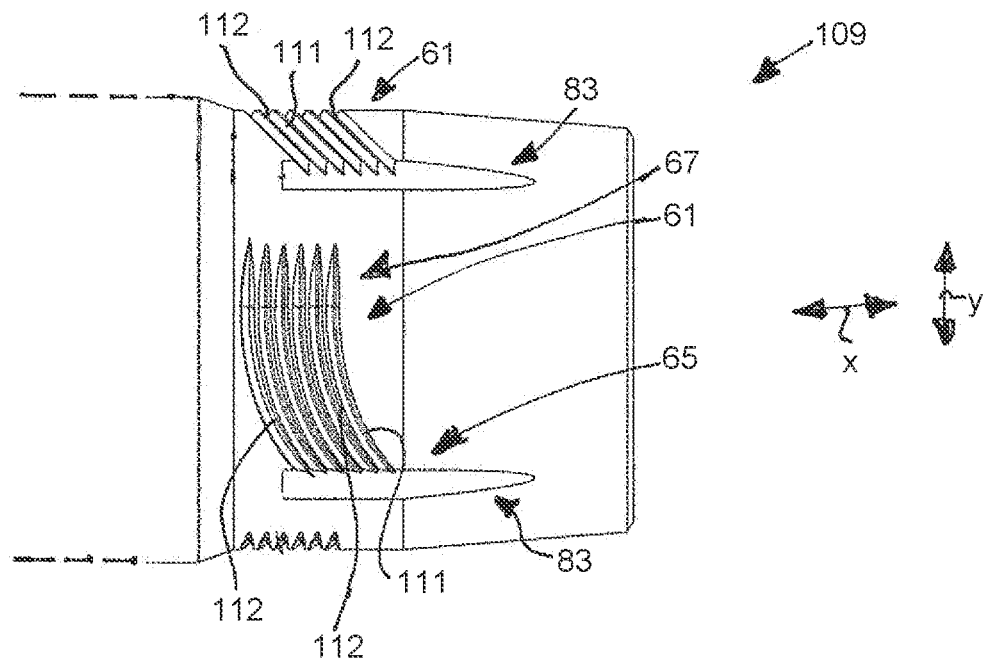
FIG. 9 is a top plan view, similar to FIG. 4, of a third exemplary embodiment of the tool holding fixture with the chucking apparatus according to the invention.

FIG. 9 shows a third exemplary embodiment of a tool holding fixture having a chucking apparatus according to the invention. The tool holding fixture has a basic body 109. In comparison to the first exemplary embodiment shown in FIGS. 1 to 7, the basic body 109 here has a basic body engagement structure 111 on the respective engagement region 61. The grooves of each basic body engagement region 111 also form a basic body thread here which has a reducing thread pitch starting from the starting region 65 toward the end region 67. However, the basic body threads 111 do not have a plurality of pitch portions with different constant thread pitches. Instead thereof, the webs 112 of the respective basic body thread 111 here have a continuously curved profile, as seen in the top view of the basic body 109 that is shown in FIG. 9. The radius of curvature of the curved threads 112 increases here continuously starting from the starting region 65 toward the end region 67 of the basic body thread 111.

Figure 10:
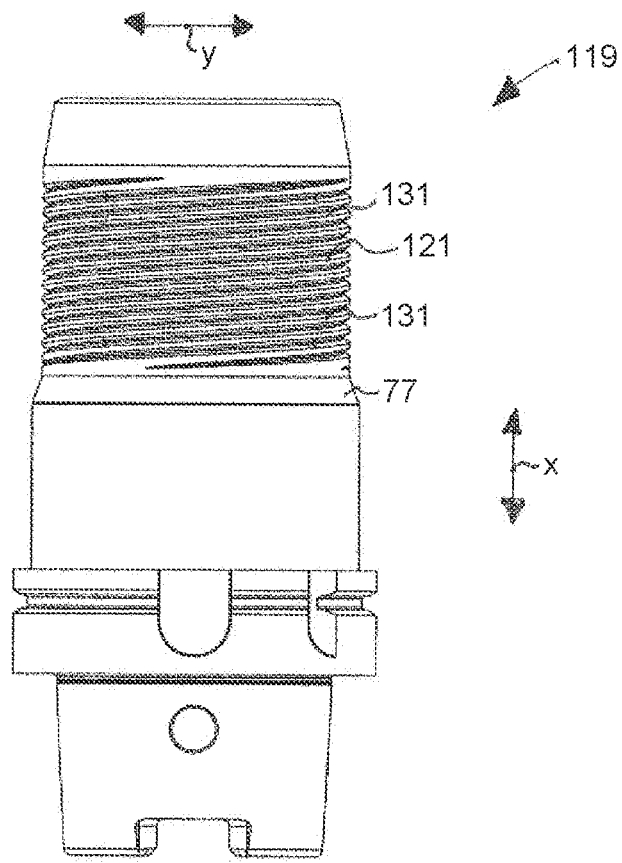
FIG. 10 is a top plan view of the basic body of a fourth exemplary embodiment of the tool holding fixture with a chucking apparatus according to the invention.

FIG. 10 shows a fourth exemplary embodiment of a tool holding fixture having a clamping apparatus according to the invention. This tool holding fixture has a basic body 119. In comparison to the first exemplary embodiment shown in FIGS. 1 to 7, the basic body 109 here does not have a plurality of engagement regions each having a basic body engagement structure. Instead thereof, the basic body 119 has a single basic body engagement structure 121 with which the roller bodies 35 of the chucking nut 19 can be brought into engagement. The chucking nut 19 can be screwed onto the basic body 119 and unscrewed from the basic body 119 by means of the mutually engaged engagement structures 49, 121 of the basic body 119 and the roller bodies 35.

The basic body engagement structure 121 is formed here by way of example by a thread having a plurality of encircling thread grooves, wherein a plurality of, here by way of example four, webs 131 running helically on the outer side around the basic body 119 are formed by the thread grooves. The basic body engagement structure 121 here is therefore in the form of a conventional four-lead thread. Alternatively, the thread could also be in the form of a single-lead thread.

Figure 11:
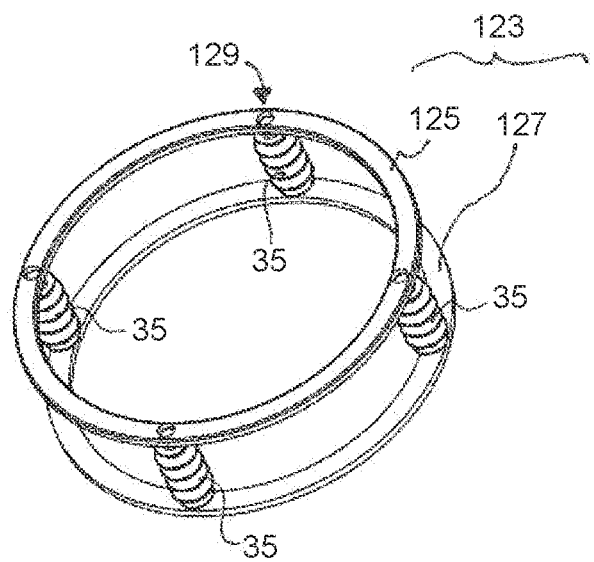
FIG. 11 is a perspective view of a bearing cage of a fifth exemplary embodiment of the tool holding fixture with the chucking apparatus according to the invention.

FIG. 11 shows a fifth exemplary embodiment of a tool holding fixture having a chucking apparatus according to the invention. The tool holding fixture has a bearing cage 123. In comparison to the first exemplary embodiment shown in FIGS. 1 to 7, the bearing cage 123 is formed by two annular receiving elements 125, 127. Each receiving element has, corresponding to the number of roller bodies 35, four continuous bores 129 as journal receptacles in which the roller bodies 35 can be arranged by means of their bearing journals 39 in a manner adapted to the contours thereof. In the mounted state of the tool holding fixture, each roller body 35 is then arranged with a bearing journal 39 in a bore 129 of the annular receiving element 125 and with the axially opposite other bearing journal 39 in a bore 129 of the receiving element 127.

Figure 12:
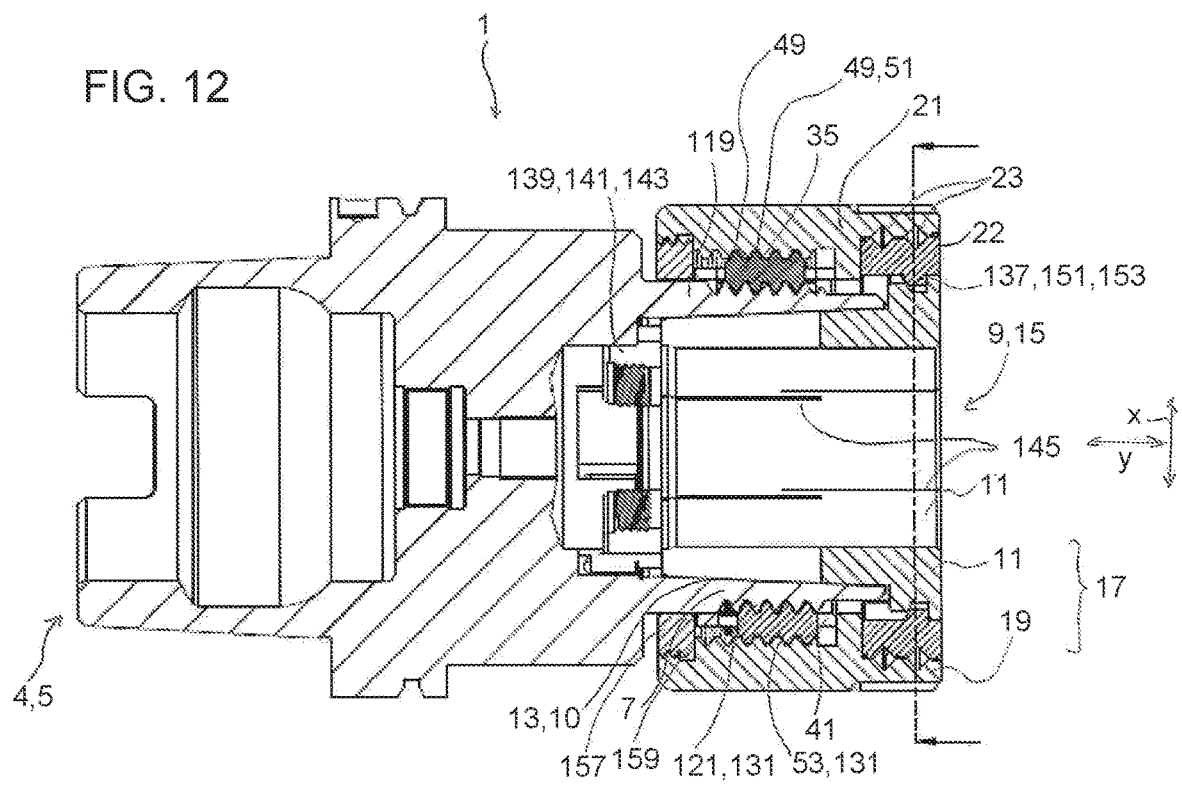
FIG. 12 is a sectional view, according to FIG. 2, of a sixth exemplary embodiment of the tool holding fixture with the chucking apparatus according to the invention.

FIG. 12 shows a sixth exemplary embodiment of a tool holding fixture 1 having a chucking apparatus according to the invention.

The "sixth" tool holding fixture 1 is designed similarly to that according to the first or the fourth exemplary embodiment, and therefore structural elements which are not described or are not described specifically below correspond to those from the first or fourth exemplary embodiment.

As FIG. 12 shows, the tool holding fixture 1 has a basic body 119 with a coupling portion 5 having a coupling device 4. The tool holding fixture 1 can be coupled releasably to a drive spindle of a machine tool, not shown here, by means of the coupling device 4. The coupling device 4 is formed here by way of example by a conventional HST interface.

As furthermore shown in FIG. 12, the basic body 119 also has a, here by way of example rotationally symmetrical, receiving portion 7 with a centrally arranged receiving space 9. The receiving space 9 here forms an inner cone 10. A resilient collet 11 which is slotted (145) in the radial direction r and has an outer cone 13 is arranged in the receiving space 9. The collet 11 is part of a chucking device 17 of the tool holding fixture 1, by means of which chucking device a tool, for example a milling tool, can be chucked nonrotatably on the tool holding fixture 1. The collet 11 here has a cylindrical tool receiving space 15 in which a tool to be chucked can be disposed by means of its tool shank.

As FIG. 12 furthermore reveals, the chucking device 17 also has a chucking nut 19 which is screwable onto the basic body 119 and by means of which the collet 11 can be pressed in the axial direction or longitudinal direction x into the receiving space 9. During such pressing in of the collet 11, the collet 11 is compressed in the radial direction r under the action of the cone surfaces of the inner cone 10 of the basic body 119 and of the corresponding outer cone 13 of the collet 11. As a result, a tool disposed in the tool receiving space 15 can be chucked nonrotatably.

The chucking nut 19 has a sleeve-shaped, here by way of example likewise rotationally symmetrical, chucking body 21 by means of which the chucking nut 19 can be pushed or screwed onto the receiving portion 7 of the basic body 3. In the pushed-on state of the chucking nut 19, the sleeve-shaped chucking body 21 engages annularly around the receiving portion 7 at a defined gap distance.

In addition, the chucking nut 19 also has an annular connecting element 22 via which the chucking nut 19 is connected releasably to the collet 11. The annular connecting element 22 is connected here in an axially rotatable manner to the sleeve-shaped chucking body 21 of the chucking nut 19 by means of rolling bearings 23. The rolling bearings 23 are formed here by cylindrical roller bearings.

The connecting element 22 of the chucking nut 19 and the collet 11 are coupled to each other via a bayonet lock 137, wherein the collet 11 provides longitudinal and transverse slots or notches 151 and the connecting element 22 has corresponding projections 153.

Figure 14:
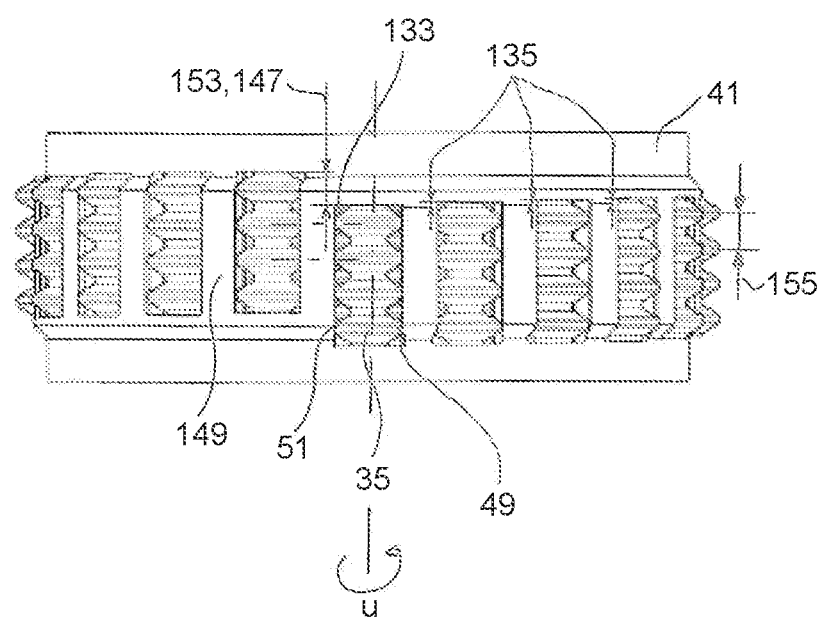
FIG. 14 is a perspective view of the bearing cage for the sixth or seventh exemplary embodiment of the tool holding fixture with a chucking apparatus according to the invention.

According to FIG. 12 (and FIG. 14), the chucking apparatus has a plurality of cylindrical roller bodies 35, here by way of example 20, which, held in a manner distributed uniformly in the circumferential direction U by a window-type cage 41 (in a corresponding number of pockets 131 (here, for example, 20)), are arranged between the chucking nut 19 and the basic body 119 (cf. in particular FIG. 14).

According to FIG. 12 (and FIG. 14), each roller body 35 has a defined roller engagement structure 49. The roller engagement structure 49 of each roller body 35 is formed here by a plurality of grooves which are spaced apart from one another in the roller axial direction (with a specifiable groove width 155) and by means of which annular webs 51 extending in the circumferential direction about the respective roller body 35 are formed. In addition, the longitudinal axis of the roller bodies 35 is arranged here parallel to the longitudinal axis of the chucking nut 19.

The roller bodies 35 are in engagement by means of their roller engagement structure 49 with a chucking body engagement structure 53 (FIG. 12) of the chucking body 21, here in the form of a single-lead (internal) thread, the pitch of which is matched to the groove width 155, for example with the pitch 5 mm (=groove width 155) which is formed on the inner circumferential surface or on an inner wall region of the chucking body 21.

Furthermore, the basic body 119 of the tool holding fixture 1, on its outer circumferential surface or on an outer wall region, has a basic body engagement structure 121 corresponding to the chucking body engagement structure 53 (FIG. 12) of the chucking body 21 or to the roller engagement structure 49 of the roller bodies 35, thus here also has a single-lead (external) thread (with the pitch 5 mm).

In the screwed-on state of the chucking nut 19, each roller body 35 by means of its roller engagement structure 49 is in engagement with the basic body engagement structure 121 of the basic body 119 and with the chucking body engagement structure 53 (FIG. 12) of the chucking body 21.

By means of the roller engagement structures 49 of the roller bodies 35 and the basic body engagement structures 121 of the basic body 119, the roller bodies and basic body can be screwed together (screwed on/unscrewed); by means of the roller engagement structures 49 of the roller bodies 35 and the chucking body engagement structure 53 of the chucking body 21, the roller bodies and chucking body can also be screwed together and the chucking nut 19 can be screwed onto the basic body 119 and unscrewed from the basic body 119.

Furthermore, as FIG. 12 shows, the chucking apparatus provides an anti-twist means 139 between the collet 11 and the basic body 119. The anti-twist means in this case is formed by axial extensions 141 on the collet 11 and complementary engagement points 143 on the basic body 119.

A covering ring 157 screwed at one end into the chucking nut 19 or the chucking body 21 of the chucking nut 19 is used to cover or shield the gap between the chucking nut 19 or the chucking body 21 of the chucking nut 19 and the basic body 119 (in which the roller bodies 35 accommodated in the window-type cage 41 are inserted). The screwing-in depth of the covering ring 157 into the chucking body 21 is defined here by means of a shoulder 159 in the chucking body 21, the shoulder simultaneously also constituting the beginning at one end of the chucking body engagement structure 53 (FIG. 12) of the chucking body 21.

The tool holding fixture 1 here, not shown, as described in the first exemplary embodiment (cf. FIG. 2) can optionally also have a clamping device for clamping the chucking nut 19 as the latter is being screwed onto the basic body 3, and also a basic body end stop with which the chucking nut 19 comes into contact as it is being screwed onto the basic body 3.

Figure 13:
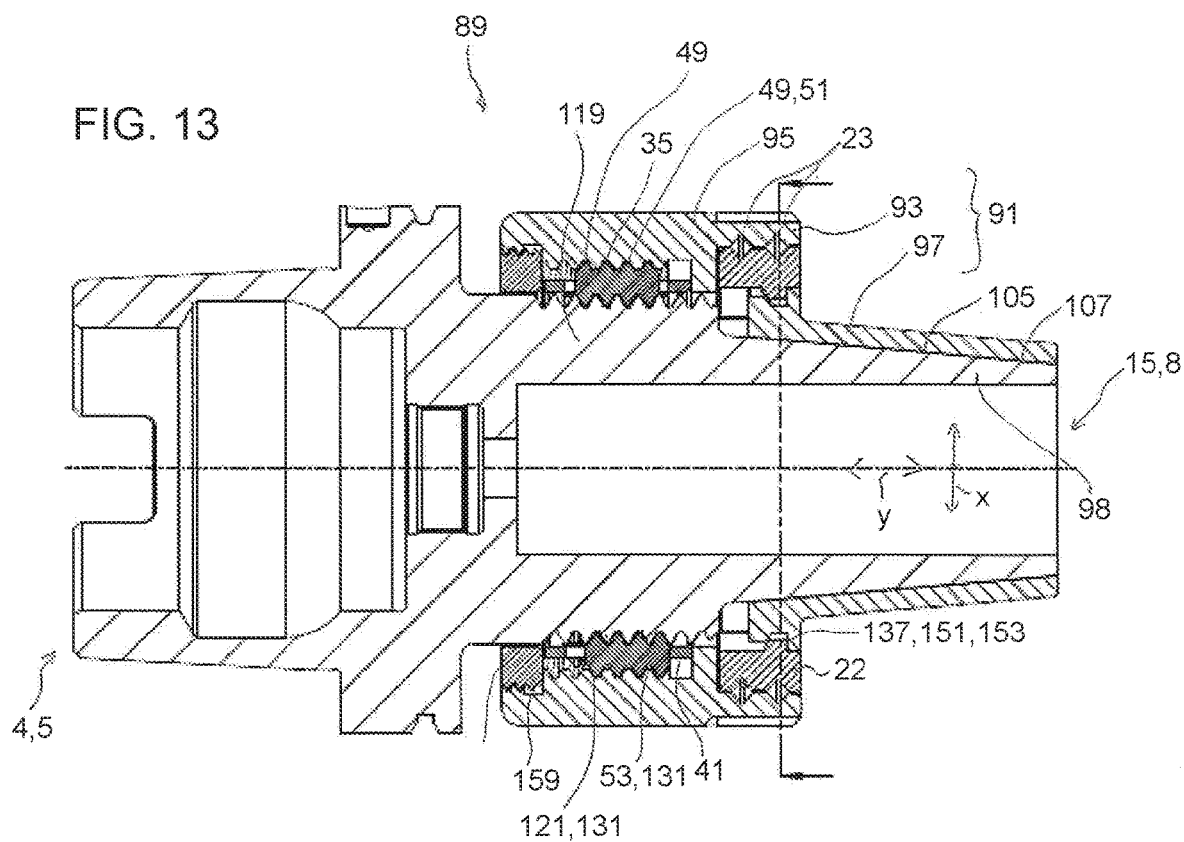
FIG. 13 is a sectional view, according to FIG. 2, of a seventh exemplary embodiment of the tool holding fixture with the chucking apparatus according to the invention.

FIG. 13 shows a seventh exemplary embodiment of a tool holding fixture 89 having a chucking apparatus according to the invention.

The "seventh" tool holding fixture 1 is formed similarly to that according to the second or the fourth exemplary embodiment, and therefore structural elements which are not described or are not described specifically below correspond to those from the first or fourth exemplary embodiment.

In comparison to the sixth exemplary embodiment shown in FIG. 12, the tool holding fixture 89 here does not have the chucking device 17, but rather a chucking device 91 for chucking a tool. A tool is chucked in the chucking device 91 without a collet.

Instead, the chucking device 91 here has a chucking nut 93 with a sleeve-shaped chucking body 95 and a likewise sleeve-shaped cone body 97 which is connected to the chucking body 95 (via the connecting element 22).

The cone body 97 which is connected to the chucking body 95 has, as FIG. 13 shows, an inner cone wall region 105 which forms an inner cone and by means of which, as the chucking nut 93 is being screwed onto the basic body 119, the cone body 97 comes into flat contact with a corresponding outer cone wall region 107, forming an outer cone, of the receiving portion 98. Under the action of the cone surfaces 105/107, as the chucking nut 93 is being screwed on further, the receiving portion 98 is pressed in the radial direction r inward against a tool disposed in the receiving space 85 and the tool is thereby chucked nonrotatably.

It also goes without saying again here that the inside diameter of the receiving portion 98 can be adapted using a cylindrical reducing bushing to a tool shank, the outside diameter of which is smaller than the inside diameter of the receiving portion 98.

Here too in this clamping apparatus, a bearing cage 41 and roller bodies 35 (cf. FIG. 14) which are held thereon and have a roller engagement structure 49 are arranged between the chucking body 95 and the basic body 119.

The roller bodies 35, for example also 20 again here, are also here again in engagement by means of their roller engagement structure 49 with a chucking body engagement structure 53 of the chucking body 95, the chucking body engagement structure being formed on the inner circumferential surface or on an inner wall region of the chucking body 95.

Furthermore, the basic body 119 also here again, on its outer circumferential surface or on an outer wall region, has a basic body engagement structure 121 corresponding to the chucking body engagement structure 53 of the chucking body 95 or to the roller engagement structure 49 of the roller bodies 35. The roller bodies 35 are also in engagement by means of their roller engagement structure 49 with the basic body engagement structure 121.

The chucking body engagement structure 53 and the basic body engagement structure 121 are each again a single-lead thread, with an exemplary pitch of 5 mm; the roller engagement structure 49 is also again formed here by grooves (from webs 51) that are spaced apart corresponding to the pitch.

In the screwed-on state of the chucking nut 19, each roller body 35 is in engagement by means of its roller engagement structure 49 with the basic body engagement structure 121 of the basic body 119 and with the chucking body engagement structure 53 (FIG. 12) of the chucking body 95.

By means of the roller engagement structures 49 of the roller bodies 35 and the basic body engagement structures 121 of the basic body 119, the roller bodies and basic body can be screwed together (screwed on/unscrewed); by means of the roller engagement structures 49 of the roller bodies 35 and the chucking body engagement structure 53 of the chucking body 95, the roller bodies and chucking body can also be screwed together and the chucking nut 93 can be pushed onto or screwed/unscrewed onto/from the receiving portion 98 of the basic body 119 by means of the sleeve-shaped chucking body 95 and the sleeve-shaped cone body 97.

In addition, the chucking nut 93 also here has an annular connecting element 22 via which the chucking nut 93 is connected releasably to the sleeve-shaped cone body 97. The annular connecting element 22 is also connected again here in an axially rotatable manner to the sleeve-shaped chucking body 95 of the chucking nut 93 by means of rolling bearings 23. The rolling bearings 23 are again formed here by cylindrical roller bearings.

In this exemplary embodiment, the connecting element 22 of the chucking nut 93 and the sleeve-shaped cone body 97 are coupled to each other again via a bayonet lock 137, wherein the sleeve-shaped cone body 97 provides the longitudinal and transverse slots or notches 141 and the connecting element 22 has corresponding projections 143.

A cover ring 157 screwed at one end into the chucking nut 93 or the chucking body 95 of the chucking nut 93 is used to cover or shield the gap between the chucking nut 93 or the chucking body 95 of the chucking nut 93 and the basic body 119 (in which the roller bodies 35 accommodated in the window-type cage 41 are introduced). The screwing-in depth of the cover ring 157 into the chucking body 95 is defined here by means of a shoulder 159 in the chucking body 95, the shoulder simultaneously also constituting the beginning at one end of the chucking body engagement structure 53 (FIG. 12) of the chucking body 95.

FIG. 14 shows the roller bodies 35 (with their roller engagement structure 49) and their window-type cage 41, as is provided for the previously described sixth and seventh exemplary embodiments (according to FIGS. 12 and 13).

As FIG. 14 shows, the cylindrical roller bodies 35, here for example 20, are distributed uniformly in the circumferential direction U, are separated by webs 149 of the window-type cage 41 and are held in the window-type cage 41 (with a corresponding number of 20 respectively identical pockets 133 distributed uniformly in the circumferential direction).

The axial length of the pockets 133 of the window-type cage 41 substantially corresponds here to the axial length of the roller bodies 35; a pocket width is greater with a small amount of play than a roller width, and therefore the roller bodies 35 can be accommodated/held with play in the pockets 133. A web side facing the pockets 133 is curved concavely (not visible) corresponding to the roller body 35.

Furthermore, as FIG. 14 also shows, respectively adjacent pockets 133—encircling in the circumferential direction U—have an axial offset 135 which is adapted to the thread pitch of the basic body engagement structure 121 or to the chucking body engagement structure 53 and to the number of roller bodies. That is to say, here, with an exemplary thread pitch of 5 mm and an exemplary number of 20 roller bodies, the axial offset 135 is 0.25 mm (5 mm/20). As a result, an (overall) offset 147 of precisely the pitch is thus then formed between the last and the first pocket of a full revolution in the window-type cage 41.

It should be mentioned that, as an alternative to such a stepped offset 135 between the pockets 133, which are thus in each case slightly offset axially, in the window-type cage 41, a continuous offset can also be made possible by a slight inclination of the pockets. The roller bodies could thus be slightly inclined, which could facilitate the screwing.

LIST OF REFERENCE SIGNS

| | |
|---|---|
| 1 | Tool holding fixture |
| 3 | Basic body |
| 4 | Coupling device |
| 5 | Coupling portion |
| 7 | Receiving portion |
| 9 | Receiving space |
| 10 | Inner cone |
| 11 | Collet |

-continued

| | |
|---|---|
| 13 | Outer cone |
| 15 | Tool receiving space |
| 17 | Chucking device |
| 19 | Chucking nut |
| 21 | Chucking body |
| 22 | Connecting element |
| 23 | Rolling bearing |
| 25 | Web |
| 27 | Shoulder |
| 29 | Wall region |
| 31 | Web |
| 33 | Web |
| 35 | Roller body |
| 37 | End wall |
| 39 | Bearing journal |
| 41 | Bearing cage |
| 42 | Recess |
| 43 | Ring segment element |
| 45 | Journal receptacle |
| 47 | Journal receptacle |
| 49 | Roller engagement structure |
| 51 | Web |
| 53 | Chucking body engagement structure |
| 55 | Wall region |
| 57 | Web |
| 59 | Basic body engagement structure |
| 61 | Engagement region |
| 63 | Web |
| 65 | Starting region |
| 67 | End region |
| 69 | Pitch portion |
| 71 | Pitch portion |
| 73 | End wall |
| 75 | Braking web |
| 76 | Shoulder |
| 77 | Outer cone wall region |
| 79 | End wall |
| 81 | Wall region |
| 83 | Receiving groove |
| 85 | Receiving space |
| 87 | central region |
| 89 | Tool holding fixture |
| 91 | Chucking device |
| 93 | Chucking nut |
| 95 | Chucking body |
| 97 | Cone body |
| 98 | Receiving portion |
| 99 | Rolling bearing |
| 101 | Web |
| 103 | Web |
| 105 | Inner cone wall region |
| 107 | Outer cone wall region |
| 109 | Basic body |
| 111 | Basic body engagement structure |
| 112 | Web |
| 115 | Recess |
| 117 | Rear engagement web |
| 119 | Basic body |
| 121 | Basic body engagement structure |
| 123 | Bearing cage |
| 125 | Receiving element |
| 127 | Receiving element |
| 129 | Bore |
| 131 | Web |
| 133 | Pocket |
| 135 | axial offset |
| 137 | Locking apparatus, bayonet lock |
| 139 | Anti-twist means |
| 141 | Extension |
| 143 | Engagement |
| 145 | Slot |
| 147 | Overall offset |
| 149 | Web |
| 151 | (Longitudinal/transverse) notch/slot |
| 153 | Projection |
| 155 | Groove width |
| 157 | Covering ring |
| 159 | Shoulder |

The invention claimed is:

1. A chucking apparatus for chucking an object, the chucking apparatus comprising:
a basic body having a receiving space formed therein in which the object can be disposed;
a chucking device having a chucking nut being screwable onto said basic body and by said chucking nut being screwed onto said basic body the object disposed in said receiving space is chuckable non-rotatably, said chucking nut having a sleeve-shaped chucking body and a plurality of cylindrical roller bodies each with a defined roller engagement structure defined by grooves formed in each of said roller bodies, wherein:
said plurality of cylindrical roller bodies are held in an axially rotatable manner on said sleeve-shaped chucking body of said chucking nut and are disposed distributed in a circumferential direction on said chucking nut, or
said plurality of cylindrical roller bodies are held and are disposed in an axially rotatable manner and distributed in the circumferential direction between said sleeve-shaped chucking body of said chucking nut and said basic body;
said basic body having at least one basic body engagement structure formed therein, wherein said cylindrical roller bodies by means of said defined roller engagement structure are in engagement or can be brought into engagement with said at least one basic body engagement structure of said basic body; and
said chucking nut is screwable onto said basic body and is unscrewable from said basic body by means of said at least one basic body engagement structure and said defined roller engagement structure which are in engagement with one another.

2. The chucking apparatus according to claim 1, wherein said basic body engagement structure is formed by a thread having at least one encircling thread groove, wherein said encircling thread groove forms at least one web running helically on an outer side around said basic body.

3. The chucking apparatus according to claim 1, wherein said chucking nut has an annular bearing cage and said cylindrical roller bodies are accommodated in said annular bearing cage.

4. The chucking apparatus according to claim 3, wherein said chucking body is a sleeve-shaped chucking body having a recess formed therein which runs on an inner side in a circumferential direction and in which said annular bearing cage is disposed in a manner matching contours thereof.

5. The chucking apparatus according to claim 4, wherein:
said sleeve-shaped chucking body has a wall region, said wall region bounding said recess on a base side, forming a chucking body engagement structure of said sleeve-shaped chucking body; and/or
said chucking body engagement structure is disposed on said wall region, which encircles in the circumferential direction, of the sleeve-shaped chucking body.

6. The chucking apparatus according to claim 3, wherein said annular bearing cage is a window-type cage having pockets for said cylindrical roller bodies;
said chucking body is a sleeve-shaped chucking body having a chucking body engagement structure; and
said cylindrical roller bodies are accommodated with large axial play in said pockets of said window-type cage, or an axial length of said pockets of said window-type cage substantially corresponds to an axial length of said cylindrical roller bodies, wherein selected said pockets of said window-type cage have an axial offset in relation to other said pockets of said window-type cage, wherein the axial offset of said pockets is adapted to a thread pitch of said at least one basic body engagement structure and/or of said chucking body engagement structure of said sleeve-shaped chucking body, by which pitch said chucking body engagement structure of said chucking body is in engagement with said defined roller engagement structure of said cylindrical roller bodies, and/or is adapted to a number of said cylindrical roller bodies.

7. The chucking apparatus according to claim 1, wherein said chucking body has a chucking body engagement structure by means of which said sleeve-shaped chucking body is in engagement with said defined roller engagement structure of said cylindrical roller bodies.

8. The chucking apparatus according to claim 7, wherein said chucking body engagement structure is formed by a plurality of spaced-apart encircling grooves by which annular webs extending on an inner side in the circumferential direction about said chucking body are formed, or in that said chucking body engagement structure is formed by a thread having at least one encircling thread groove, wherein said encircling thread groove forms at least one web running helically on said inner side in the circumferential direction about said chucking body, wherein said thread has a plurality of leads and a number of thread leads corresponds to a number of said cylindrical roller bodies.

9. The chucking apparatus according to claim 1, wherein said chucking device has a collet which is disposed in said receiving space of said basic body and said collet has an object receiving space formed therein, said collet is resilient in a radial direction and has an outer cone, and said collet is pressable by means of said chucking nut into said receiving space of said basic body, said receiving space of said basic body forming an inner cone, and therefore the object disposed in said object receiving space of said collet can be chucked nonrotatably.

10. The chucking apparatus according to claim 9, further comprising:
an annular connecting element via which said chucking nut is connected releasably to said collet;
rolling bearings, said annular connecting element is connected in an axially rotatable manner to said sleeve-shaped chucking body of said chucking nut by means of said rolling bearings; and/or
a locking apparatus, said annular connecting element is locked or lockable to said collet by means of said locking apparatus.

11. The chucking apparatus according to claim 1, wherein:
said basic body has a receiving portion; and
said chucking nut has a sleeve-shaped cone body which is connected to said chucking body and has an inner cone wall region forming an inner cone, wherein, when said chucking nut is screwed onto said basic body, said sleeve-shaped cone body by means of said inner cone wall region comes into contact with said receiving portion of said basic body, said receiving portion forming said receiving space, and presses said receiving portion inward against the object disposed in said receiving space and therefore chucks the object non-rotatably.

12. The chucking apparatus according to claim 1, wherein said basic body has slots formed therein and/or an end stop, with which said chucking nut comes into contact upon being screwed onto said basic body.

13. The chucking apparatus according to claim 12, wherein:
said basic body contains an end side, at least one wall region, at least one further wall region and a basic body engagement region having said least one basic body engagement structure; and
said end stop is formed by said at least one wall region on said end side or oriented on said end side of said basic body or by said at least one further wall region of said basic body, said at least one further wall region bounding said basic body engagement region in the circumferential direction.

14. The chucking apparatus according to claim 1, wherein:
said chucking nut having a clamping device for clamping said chucking nut when said chucking nut is screwed onto said basic body, said clamping device having an annular clamping web; and
said chucking body is a sleeve-shaped chucking body and has said annular clamping web of said clamping device, said annular clamping web protruding from an end wall of said sleeve-shaped chucking body and by means of which said chucking nut comes into flat contact with a corresponding contact wall region upon being screwed onto said basic body.

15. The chucking apparatus according to claim 1, wherein:
each of said cylindrical roller bodies has bearing journals which protrude on end sides of said cylindrical roller bodies and by means of said bearing journals a respective cylindrical roller body of said cylindrical roller bodies is held in an axially rotatable manner on said chucking body of said chucking nut; or
said chucking nut has a circular bearing cage and each of said cylindrical roller bodies is mounted, in an axially rotatable manner, by means of said bearing journals, in said circular bearing cage of said chucking nut; and
said circular bearing cage is formed from multiple parts with a plurality of cross-sectionally rectangular, ring segment elements and at least one of said cylindrical roller bodies is assigned to at least one portion of said cross-sectionally rectangular, ring segment elements.

16. A tool holding fixture for a machine tool, comprising: a chucking apparatus according to claim 1.

17. The tool holding fixture according to claim 16, further comprising a coupling device by means of which said tool holding fixture is couplable to a drive device for rotationally driving said tool holding fixture.

18. A machine tool, comprising:
a tool holding fixture according to claim 16.

19. A chucking apparatus for chucking an object, the chucking apparatus comprising:
a basic body having a receiving space formed therein in which the object can be disposed, said basic body having a plurality of engagement regions which are distributed and/or are spaced apart from one another and include said at least one basic body engagement structure formed on said basic body;
a chucking device having a chucking nut being screwable onto said basic body and by said chucking nut being screwed onto said basic body the object disposed in said receiving space is chuckable non-rotatably, said chucking nut having a chucking body and a plurality of roller bodies each with a defined roller engagement structure, wherein:
said plurality of roller bodies are held in an axially rotatable manner on said chucking body of said chucking nut and are disposed distributed in a circumferential direction on said chucking nut, or said plurality of roller bodies are held and are disposed in an axially rotatable manner and distributed in the circumferential direction between said chucking body of said chucking nut and said basic body;

said basic body having at least one basic body engagement structure formed therein, wherein said roller bodies by means of said defined roller engagement structure are in engagement or can be brought into engagement with said at least one basic body engagement structure of said basic body; and said chucking nut is screwable onto said basic body and is unscrewable from said basic body by means of said at least one basic body engagement structure and said defined roller engagement structure which are in engagement with one another, said roller bodies by means of said defined roller engagement structure are in engagement or can be brought into engagement with said at least one basic body engagement structures of said basic body; and said chucking nut is screwable onto said basic body and is unscrewable from said basic body by means of said at least one basic body engagement structure and said defined roller engagement structure, which are in engagement with one another, of said roller bodies and of said basic body.

20. The chucking apparatus according to claim 19, wherein said defined roller engagement structure of each of said cylindrical roller bodies is formed by a plurality of encircling grooves which are spaced apart from one another in a roller axial direction and are formed as annular webs extending in a circumferential direction about a respective one of said cylindrical roller bodies.

21. A chucking apparatus for chucking an object, the chucking apparatus comprising:

a basic body having a receiving space formed therein in which the object can be disposed;

a chucking device having a chucking nut being screwable onto said basic body and by said chucking nut being screwed onto said basic body the object disposed in said receiving space is chuckable non-rotatably, said chucking nut having a sleeve-shaped chucking body and a plurality of cylindrical roller bodies each with a defined roller engagement structure, wherein:

said plurality of cylindrical roller bodies are held in an axially rotatable manner on said sleeve-shaped chucking body of said chucking nut and are disposed distributed in a circumferential direction on said chucking nut, or said plurality of cylindrical roller bodies are held and are disposed in an axially rotatable manner and distributed in the circumferential direction between said sleeve-shaped chucking body of said chucking nut and said basic body;

said basic body having at least one basic body engagement structure formed therein, wherein said cylindrical roller bodies by means of said defined roller engagement structure are in engagement or can be brought into engagement with said at least one basic body engagement structure of said basic body; and said chucking nut is screwable onto said basic body and is unscrewable from said basic body by means of said at least one basic body engagement structure and said defined roller engagement structure which are in engagement with one another, wherein:

each of said cylindrical roller bodies has bearing journals which protrude on end sides and by means of said bearing journals a respective cylindrical roller body of said cylindrical roller bodies is held in an axially rotatable manner on said chucking body of said chucking nut; or said chucking nut has an annular bearing cage and each of said cylindrical roller bodies is mounted, in an axially rotatable manner in said annular bearing cage of said chucking nut.

\* \* \* \* \*